United States Patent
Chakrabarty et al.

(10) Patent No.: US 11,714,129 B2
(45) Date of Patent: Aug. 1, 2023

(54) OBSERVATION POINT INJECTION FOR INTEGRATED CIRCUIT TESTING

(71) Applicant: Duke University, Durham, NC (US)

(72) Inventors: Krishnendu Chakrabarty, Durham, NC (US); Arjun Chaudhuri, Durham, NC (US)

(73) Assignee: DUKE UNIVERSITY, Durham, NC (US)

(*) Notice: Subject to any disclaimer, the term of this patent is extended or adjusted under 35 U.S.C. 154(b) by 140 days.

(21) Appl. No.: 17/410,654

(22) Filed: Aug. 24, 2021

(65) Prior Publication Data

US 2022/0065926 A1    Mar. 3, 2022

Related U.S. Application Data

(60) Provisional application No. 63/070,411, filed on Aug. 26, 2020.

(51) Int. Cl.
*G01R 31/3177* (2006.01)
*G06F 30/327* (2020.01)
*G06F 30/392* (2020.01)
*G06F 119/02* (2020.01)

(52) U.S. Cl.
CPC ....... *G01R 31/3177* (2013.01); *G06F 30/327* (2020.01); *G06F 30/392* (2020.01); *G06F 2119/02* (2020.01)

(58) Field of Classification Search
CPC ........ G01R 31/3177; G01R 31/318364; G06F 30/327; G06F 30/392; G06F 2119/02
See application file for complete search history.

(56) References Cited

U.S. PATENT DOCUMENTS

| | | |
|---|---|---|
| 6,363,520 B1 | 3/2002 | Boubezari et al. |
| 7,888,764 B2 | 2/2011 | Lee |
| 10,127,344 B2 | 11/2018 | Or-Bach et al. |
| 2016/0197069 A1 | 7/2016 | Morrow et al. |

OTHER PUBLICATIONS

Shreepad Panth et al., "Design Challenges and Solutions for Ultra-High-Density Monolithic 3D ICs", 2014 SOI-3D-Subthreshold Microelectronics Technology Unified Conference (S3S), 2014, 2 pages.

(Continued)

*Primary Examiner* — Stacy Whitmore
(74) *Attorney, Agent, or Firm* — Talem IP Law, LLP

(57) ABSTRACT

A method for identifying observation points for integrated circuit (IC) testing includes receiving a netlist for an IC that includes a first subcircuit and a second subcircuit; determining, from the netlist, one or more observation points, each determined observation point corresponding to an output node which provides observability, into at least the first subcircuit, of an effective number of gates above a specified threshold; and inserting a design for test element into a layout file of the IC at each determined observation point. Observation points can be determined by transforming the netlist into a node graph; assigning a same initial value to a value field of each node; and propagating values in the value fields of the nodes until all nodes with a succeeding edge have a value of zero in their value fields.

18 Claims, 10 Drawing Sheets

(56) References Cited

OTHER PUBLICATIONS

Deepak Kumar Nayak et al., "Power, Performance, and Cost Comparisons of Monolithic 3D ICs and TSV-based 3D ICs", 2015 IEEE SOI-3D-Subthreshold Microelectronics Technology Unified Conference (S3S), 2015, 2 pages.

Abishek Koneru et al., "Impact of Electrostatic Coupling and Wafer-Bonding Defects on Delay Testing of Monolithic 3D Integrated Circuits", ACM Journal on Emerging Technologies in Computing Systems, vol. 13, No. 4, Article 54, Jul. 2017, 23 pages.

Heechun Park et al., "RTL-to-GDS Tool Flow and Design-for-Test Solutions for Monolithic 3D ICs" DAC '19, Jun. 2-6, 2019, 4 pages.

Arjun Chaudhuri et al., "Built-in Self-Test for Inter-Layer Vias in Monolithic 3D ICs", 2019 24th IEEE European Test Symposium (ETS), 2019, 6 pages.

Shreepad Panth et al., "Placement-Driven Partitioning for Congestion Mitigation in Monolithic 3D IC Designs" IEEE Transactions on Computer-Aided Design of Integrated Circuits and Systems, vol. 34, No. 4, Apr. 2015, 14 pages.

Kyungwook Chang et al., "Design Automation and Testing of Monolithic 3D ICs: Opportunities, Challenges, and Solutions" 2017 IEEE/ACM International Conference on Computer-Aided Design (ICCAD), 2017, 6 pages.

Laurent Brunet et al., "Direct Bonding: A Key Enabler for 3D Monolithic Integration" ECS Transactions, 64 (5), 2014, 11 pages.

Junkai Jiang et al., "Monolithic-3D Integration with 2D Materials: Toward Ultimate Vertically-Scaled 3D-ICs" 2018 IEEE SOI-3D-Subthreshold Microelectronics Technology Unified Conference (S3S), 2018, 3 pages.

Zvi Or-Bach et al., "Game Changing Breakthrough—IEEE S3S 2014" 2014, 29 pages, Retrieved on: Sep. 1, 2021, Retrieved from: www.monolithic3d.com/blog/category/3d%ic.

Chang Liu et al., "A Design Tradeoff Study with Monolithic 3D Integration" 13th Int'l Symposium on Quality Electronic Design, 2012, 8 pages.

Shreepad Panth et al., "High-Density Integration of Functional Modules Using Monolithic 3D-IC Technology" 2013 18th Asia and South Pacific Design Automation Conference (ASP-DAC), 2013, 6 pages.

Pascal Vivet et al., "Monolithic 3D : an alternative to advanced CMOS scaling, technology perspectives and associated design methodology challenges" 2018 25th IEEE International Conference on Electronics, Circuits and Systems (ICECS), 2018, 4 pages.

Rachid Kermouche et al., "Defect and Fault Tolerant Scan Chains" International Workshop on Defect and Fault Tolerance in VLSI Systems, 1994, 9 pages.

Yu Huang et al., "Survey of Scan Chain Diagnosis", IEEE Design & Test of Computers, 2008, 9 pages.

Zipeng Li et al., "Efficient Observation-Point Insertion for Diagnosability Enhancement in Digital Circuits" International Test Conference, 2015, 10 pages.

Toshinori Hosokawa et al., "Design for Testability Strategies Using Full/Partial Scan Designs and Test Point Insertions to Reduce Test Application Times" Proceedings of the ASP-DAC 2001. Asia and South Pacific Design Automation Conference 2001 (Cat. No. 01EX455), 2001, 7 pages.

Snehal Udar et al., "Minimizing Observation Points for Fault Location", 2009 24th IEEE International Symposium on Defect and Fault Tolerance in VLSI Systems, 2009, 5 pages.

Cheng-Hung Wu et al., "Improve Transition Fault Diagnosability via Observation Point Insertion" VLSI Design, Automation and Test(VLSI-DAT), 2015, 4 pages.

M.J. Geuzebroek et al., "Test Point Insertion for Compact Test Sets" ITC International Test Conference, 2000, 10 pages.

M.J. Geuzebroek et al.,"Test Point Insertion that facilitates ATPG in reducing test time and data volume" ITC International Test Conference, 2002, 10 pages.

Irith Pomeranz, "Gradual Diagnostic Test Generation and Observation Point Insertion Based on the Structural Distance Between Indistinguished Fault Pairs" IEEE Transactions on Very Large Scale Integration (VLSI) Systems, Apr. 29, 2011, 10 pages, vol. 20, No. 6.

Irith Pomeranz, et al. "Z-DFD: Design-for-Diagnosability Based on the Concept of Z-Detection" ITC International Test Conference, 2004, 9 pages.

Santiago Remersaro et al. "ATPG Heuristics Dependant Observation Point Insertion for Enhanced Compaction and Data Volume Reduction" IEEE International Symposium on Defect and Fault Tolerance of VLSI Systems, 2008, 9 pages.

Arjun Chaudhuri et al., "NodeRank: Observation-Point Insertion for Fault Localization in Monolithic 3D ICs" 2020 IEEE 29th Asian Test Symposium (ATS), 2020, 6 pages.

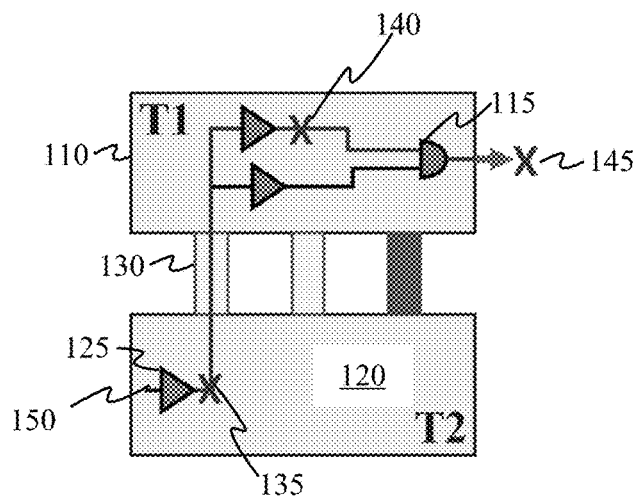
Figure 1A
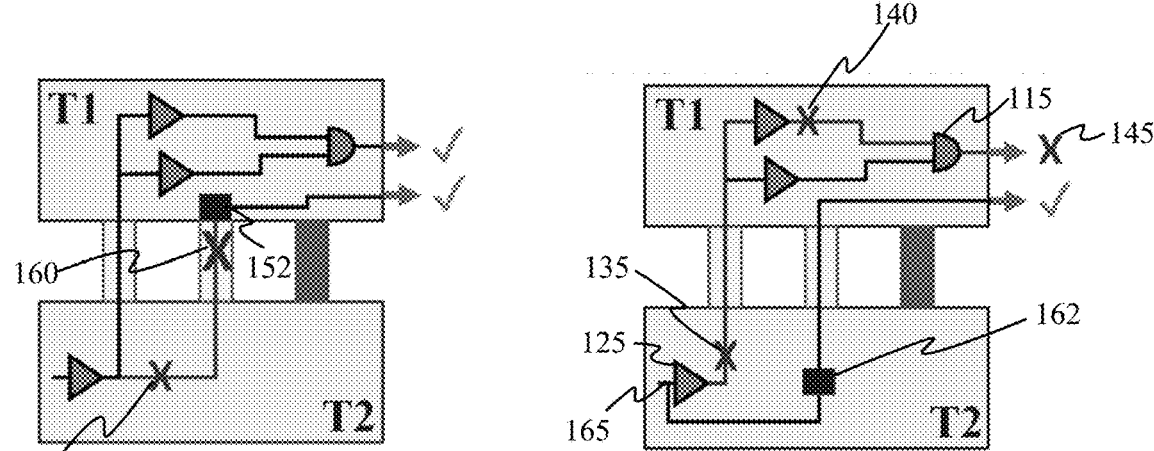
Figure 1B
Figure 1C
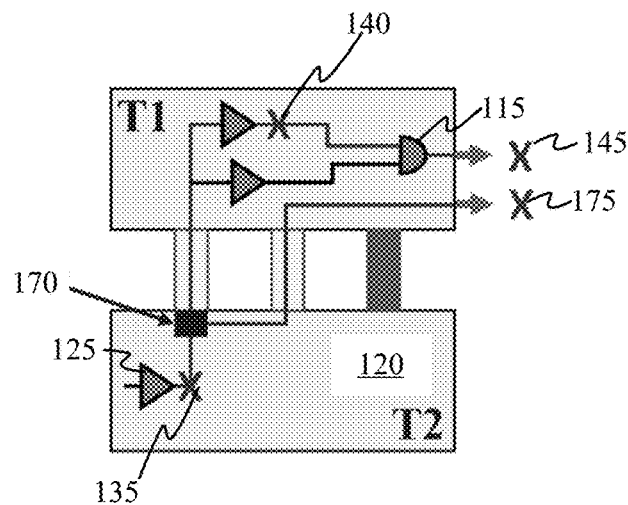
Figure 1D

OBSERVATION POINT INJECTION FOR INTEGRATED CIRCUIT TESTING

GOVERNMENT SUPPORT

This invention was made with Government support under Federal Grant nos. HR001118C0096 awarded by the Defense Advanced Research Projects Agency (DARPA) and 1908045 awarded by the National Science Foundation (NSF). The Federal Government has certain rights to this invention.

BACKGROUND

Three-dimensional integrated circuits have long been known and utilized in chip fabrication to minimize footprint and power loss between subcircuits. Typically, three-dimensional integrated circuits are achieved by stacking independently fabricated dies and interconnecting vertically using vias, such as through-silicon vias. Monolithic 3D (M3D) integrated circuits (ICs) have emerged as a promising technology with significant improvement in power, performance, and area (PPA) over conventional 3D-stacked ICs. In M3D ICs, rather than fabricating individual dies separately and then joining two or more dies via stacking, two or more tiers of ICs are grown or fabricated together.

However, the sequential fabrication of M3D tiers and immature fabrication process are prone to manufacturing defects and inter-tier process variations. Furthermore, as the tiers are fabricated together rather than separately, it can be more difficult to test an individual tier compared to traditional three-dimensional ICs. Tier-level fault localization is therefore essential to identify M3D tiers that are more susceptible to faults, which in turn provides feedback regarding pitfalls in manufacturing and design rules to the foundry for yield ramp-up. Due to overhead concerns, only a limited number of observation points (OPs) can be inserted on the outgoing inter-layer vias (ILVs) of a tier to enable fault localization.

BRIEF SUMMARY

Observation point injection for integrated circuit testing is provided. Identifying observation points within an integrated circuit can allow for efficient testing of monolithic three-dimensional integrated circuits as well as other multi-circuit integrated circuits. Indeed, appropriately inserted observation points can be used to isolate subcircuits or entire tiers of monolithic three-dimensional integrated circuits to aid in pinpointing potential faults.

A method, performed at a computing device, for identifying observation points for integrated circuit testing can include: receiving a netlist for an integrated circuit comprising at least a first subcircuit and a second subcircuit; determining, from the netlist, one or more observation points, each determined observation point corresponding to an output node which provides observability, into at least the first subcircuit, of an effective number of gates above a specified threshold; and inserting a design for test element into a layout file of the integrated circuit at each determined observation point Determining the one or more observation points can include transforming the netlist into a node graph, wherein each node corresponds to a gate and each edge corresponds to a connection between two gates and wherein each node includes a value field; assigning a same initial value to the value field of each node; and propagating values in the value fields of the nodes until all nodes with a succeeding edge have a value of zero in their value fields. The process of propagating the values in the nodes can include dividing a value of a first value field of a first node into equal parts for each succeeding edge of the first node; and adding the divided value to a second value field of a second node, wherein the second node is an immediately succeeding node on a succeeding edge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1A-1D illustrate a visualization of curating potential locations for observation point insertion for tier-level fault localization.

FIG. 6A shows a table of an evaluation of the effectiveness of observation point insertion for stuck-at and transition faults in two-tier M3D designs.

FIG. 6B shows a table of experimental results, comparing use of OP analysis to a more widespread methodology in terms of pattern sets and percentage of faults that were able to be localized.

DETAILED DESCRIPTION

Figure 2A:
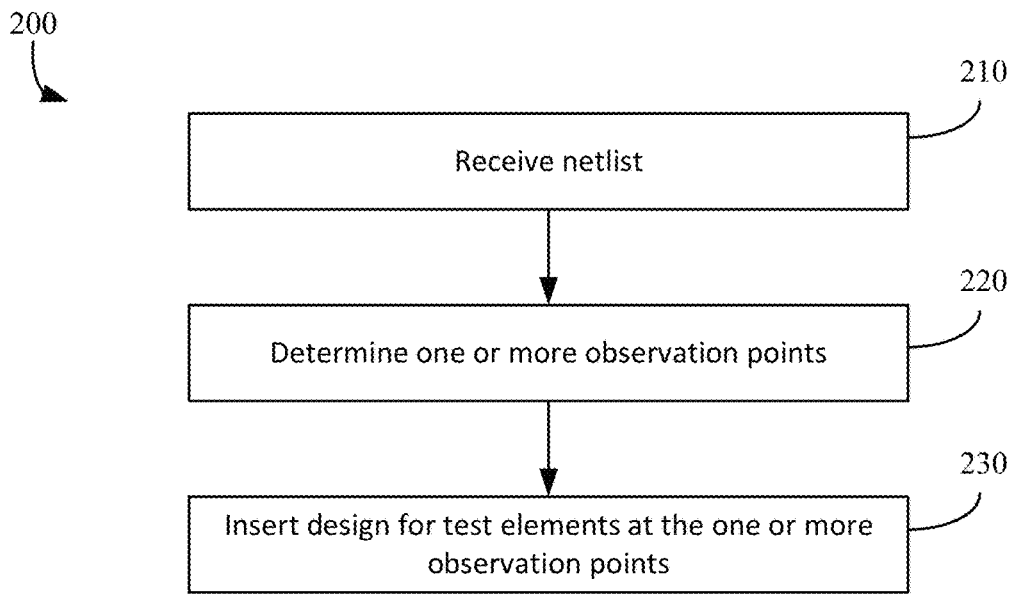
FIG. 2A illustrates a method for applying observation points for integrated circuit testing.

Observation point injection for integrated circuit testing is provided. Identifying observation points within an integrated circuit can allow for efficient testing of monolithic three-dimensional integrated circuits as well as other multi-circuit integrated circuits. Indeed, appropriately inserted observation points can be used to isolate subcircuits or entire tiers of monolithic three-dimensional integrated circuits to aid in pinpointing potential faults.

Advantageously, the described observation point identification and insertion is independent of time-consuming automated test pattern generation (ATPG) and/or fault simulation runs, and is entirely driven by circuit topology.

FIGS. 1A-1D illustrate a visualization of curating potential locations for observation point insertion for tier-level fault localization. It is desirable to perform circuit testing in a manner that identifies problems—due to manufacturing defects—very quickly. While it would be ideal to be able to check every gate and connection, such a process would be time consuming and require a significant amount of overhead (e.g., chip area) to access everything. Therefore, strategies are employed to identify a subset of areas in which to observe circuit behavior. For example, boundary scan chains are common design for test elements that enable the capturing of information along the outside/outputs of a circuit.

However, certain ICs, including M3D ICs include features that make it difficult to identify where within the circuit a fault may be located when only the outside/outputs are observed. An observation point, if inserted into suitable locations within the integrated circuit such as accomplished via the methods described herein, can enable fault localization.

Referring to FIGS. 1A-1D, in the illustrated visualization, an integrated circuit in the form of a M3D IC includes two tiers: a first tier 110 and a second tier 120. The first tier 110 can include a first circuit 115 and the second tier 120 can include a second circuit 125. The integrated circuit can have one or more interlayer vias (ILVs) 130 that connect between the first tier 110 and the second tier 120. In the case that there is a fault site 135 at the output of the second circuit 125 and a fault site 140 within the first circuit 115, it can be challenging to identify where the faults are by just capturing information of a fault at the output 145.

As mentioned above, fault testing is performed by applying a test pattern, for example at an input 150 of the second tier 120 and detecting the output 145 at the first tier 110.

Turning to FIG. 1A, it can be seen that simply measuring the value at the output 145 can indicate that there is an error (and thus a fault), but not where (e.g., on which tier) the fault is. Since both the first circuit 115 and second circuit 125 are in the signal path to the output 145, the fault could be at the first tier 110 or the second tier 120.

Turning to FIG. 1B, if an observation point 152 is placed at a succeeding end of an ILV 130, a fault 155 in the second tier 120 can be masked by an ILV fault 160. That is, the observation point 152 at the succeeding edge of the ILV 130 may cause the fault determination to assume that the fault is only at the ILV and would miss the fault 155 in the second tier 120.

Turning to FIG. 1C, if an observation point 162 is placed within a circuit (e.g., coupled to an internal signal path 165), downstream faults can potentially be not localized. As can be seen, in the case that there is a fault site 135 at the output of the second circuit 125 and a fault site 140 within the first circuit 115, a fault at the output 145, but the observation point 162 within the second circuit 125 will not enable localization of the downstream fault at fault site 135.

Turning to FIG. 1D, using one or more observation points identified as described herein can allow identification of the location of faults within an integrated circuit. By providing an observation point 170 located at a preceding edge of an ILV 130 and which is located at an output node which provides observability, into at least the second circuit 125, of an effective number of gates above a specified threshold, a fault can be determined to definitively exist in the second tier 120 in the case that there is a fault site 135 at the output of the second circuit 125 and a fault site 140 within the first circuit 115. As can be seen, the observation point 170 allows for a fault output 175 to be identified separate from the fault output 145, enabling fault localization. It should be noted that the observation points are shown and discussed with respect to the ILV 130; however, analysis can also be performed on a subcircuit, rather than an entire tier. In the case that analysis is performed on a subcircuit, an output that encompasses the subcircuit in its fanout can correspond to the ILV 130.

Accordingly, appropriate placement of observation points enables localization of faults.

The design process for electronic circuits includes a step for placement of circuit elements and routing of wires and interconnections. This can be carried out at the chip level—for integrated circuits or a field programmable gate array—or at a circuit board level—for printed circuit boards or other circuit packages. Electronic design automation (EDA) tools, such as available through Cadence Design Systems, Inc. and Synopsys, Inc., are used during the place and route stage to optimize arrangements and enable increased complexity in design (as compared to manual layout).

The physical design stage of an integrated circuit design process generally includes logic synthesis, floor planning, power planning, placement, clock tree synthesis, routing, verification, and "tapeout" (export of data in form for manufacturing). These stages may be carried out using associated tools that may individually or together form an EDA tool. For example, in one EDA tool with automatic place and route (APR) software, a gate-level netlist, which may be obtained from a logic synthesis tool (as part of the logic synthesis stage), is physically implemented in a layout by placing standard-cell layout (placement stage) and then auto-routing cells (routing stage) based on the connections inferred from the netlist. Where the APR software is separate from that used in the subsequent stages, the routed design can be exported from the APR tool in a format that can be understood by post analysis tools such as extraction or power analysis tools.

The described processes for identifying observation points within an integrated circuit and associated element insertion and test generation can be provided as part of one or more software modules of an EDA tool that when executed by a computing device direct the computing device to perform these processes.

FIG. 2A illustrates a method for applying observation points for integrated circuit testing. Referring to FIG. 2A, method 200 includes receiving (210) a netlist for an integrated circuit comprising at least a first subcircuit and a second subcircuit; determining (220), from the netlist, one or more observation points, each determined observation point corresponding to an output node which provides observability, into at least the first subcircuit, of an effective number of gates above a specified threshold; and inserting (230) a design for test element into a layout file of the integrated circuit at each determined observation point.

Figure 2B:
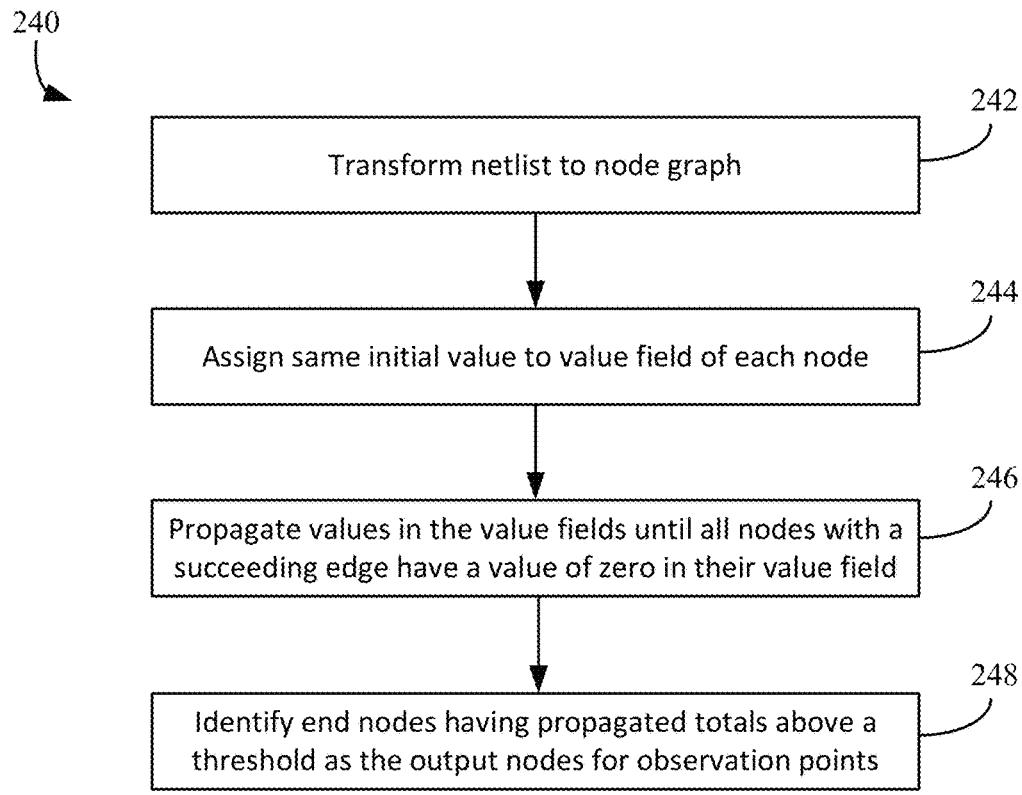
FIG. 2B illustrates an example method for determining the one or more observation points from a netlist.

FIG. 2B illustrates an example method for determining the one or more observation points from a netlist. Referring to FIG. 2B, operation 220 of FIG. 2A may be implemented according to method 240, which includes transforming (242) the netlist into a node graph, wherein each node corresponds to a gate and each edge corresponds to a connection between two gates and wherein each node includes a value field; assigning (244) a same initial value to the value field of each node; propagating (246) values in the value fields of the nodes until all nodes with a succeeding edge have a value of zero in its value field; and identifying (248) end nodes having propagated totals above a threshold, the identified end nodes being the output nodes at which the observation points are located.

As described in more detail with respect to FIGS. 4A-4D, in some cases, propagating (246) the values in the nodes involves dividing a value of a first value field of a first node into equal parts for each succeeding edge of the first node; and adding the divided value to a second value field of a second node, wherein the second node is an immediately succeeding node on a succeeding edge.

Figure 2C:
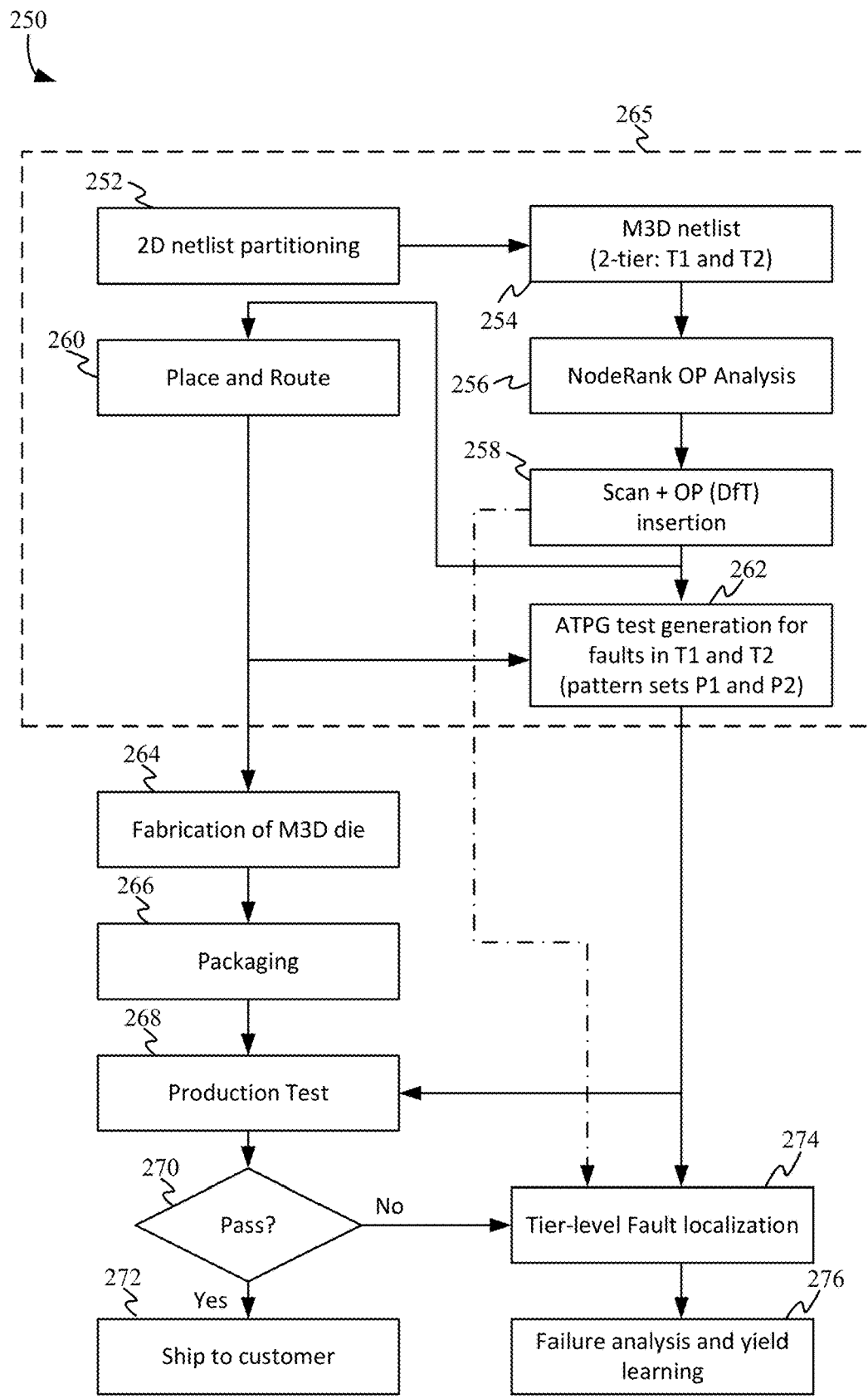
FIG. 2C illustrates a process for designing integrated circuits that incorporates observation point insertion.

FIG. 2C illustrates a process for designing integrated circuits that incorporates observation point insertion. Referring to FIG. 2C, a design and fabrication process 250 can include first receiving a netlist for an integrated circuit comprising at least a first subcircuit and a second subcircuit. The netlist can be partitioned (252) to create a M3D netlist (254). A netlist describes the connectivity of a circuit and may be in a format such as Verilog, VHDL, Spice, or other languages that can be synthesized and used by placement and routing tools (before manufacturing preparation).

After the netlist is received and partitioned, one or more observation points can be determined (256). These one or more observation points can correspond to output nodes which provide observability above a specified threshold into at least the first subcircuit. Operation 256 can be carried out as described with respect to method 240 of FIG. 2B. In some cases, the process for determining observation points is as described with respect to FIGS. 4A-4D.

After the observation points are determined, elements for the one or more observation points can be inserted (258) into a layout file generated as part of a place and route 260 that represents the received netlist. During placement (as part of the place and route 260), a synthesized circuit netlist and a technology library are used to create a valid placement layout. Standard cells (from a technology library) can be used to facilitate placement (as the cells are of known size and characteristics). Following placement, routing can be performed. Where placement determines the location of each active element or component, the routing step adds the wires needed to properly connect the placed components while obeying design rules. The observation points can be added as scan flops or other circuit elements that provide outside read and write functionality into an integrated circuit. These elements can be inserted at the locations associated with the observation points as part of the placement operations of the place and route 260 steps (which can also include optimization operations that include, but are not limited to reducing the area, power consumption, speed of operation, testability, and manufacturability of the gates, circuit elements, design blocks, integrated circuits, and chips) and may be performed after a placement operation of the EDA tool.

After the layout is finalized (e.g., place and route 260 steps are completed), automatic test pattern generation (ATPG) can be performed (262) using the layout file having the determined one or more observation points and tape out can occur for fabrication (264) of the M3D die. Operations 252, 254, 256, 258, 260, and 262 (collectively process 265) can be performed as part of an EDA tool or tools.

Back-end processes including packaging (266) and production test (268) are carried out. The production test can utilize the test patterns made during ATPG 262. Based on the production testing, a pass/fail determination (270) is made. If the production test is successful, the product can be shipped (272). If the test is not successful, then tier-level fault localization can be performed (274). Illustrative examples of tier-level fault localization are described with respect to FIGS. 3A and 3B. Based on the results of tier-level fault localization, failure analysis and yield learning can occur (276).

Figure 3A:
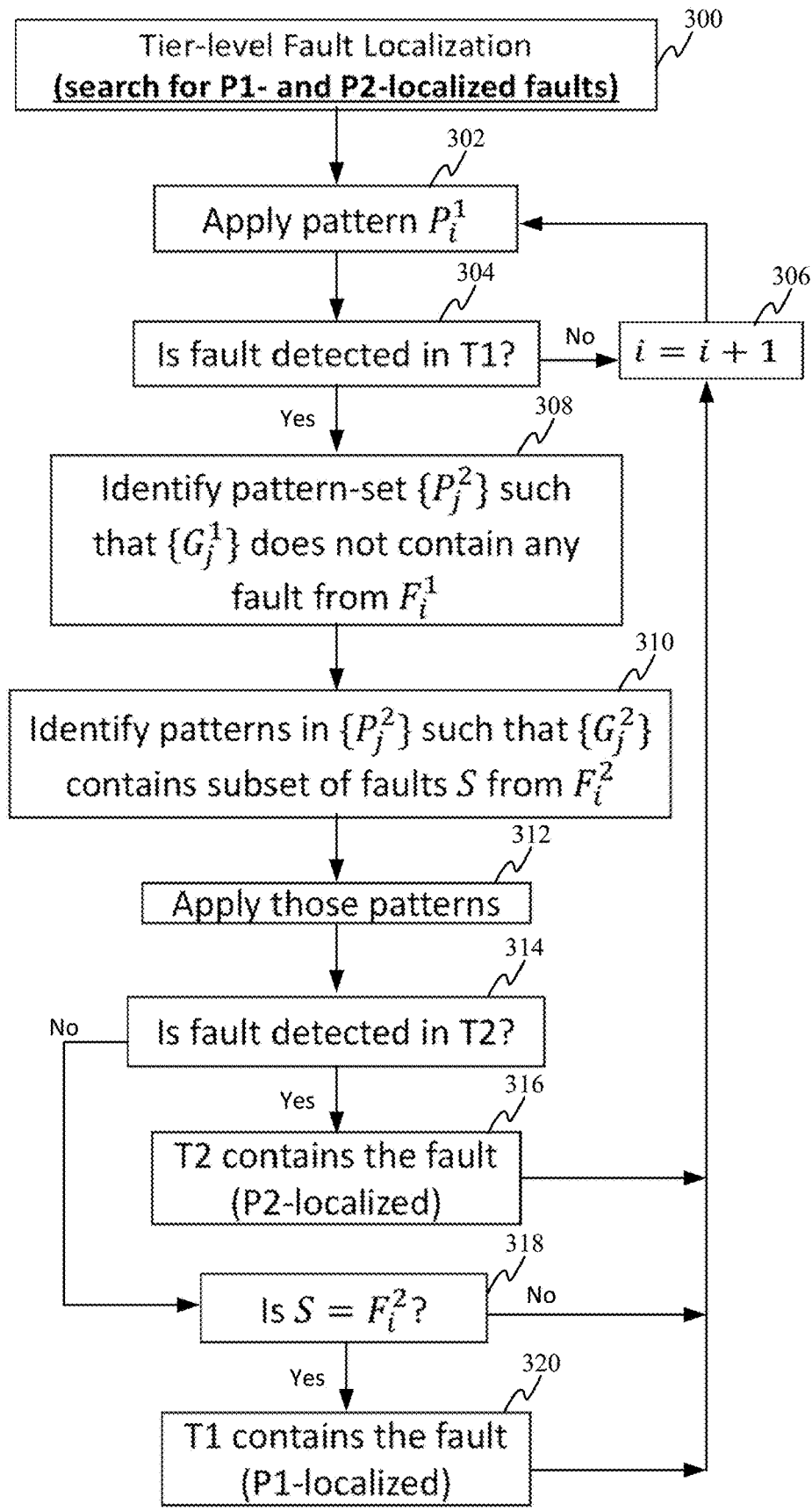
FIGS. 3A and 3B illustrate process flows for determining tier-level fault localization.
Figure 3B:
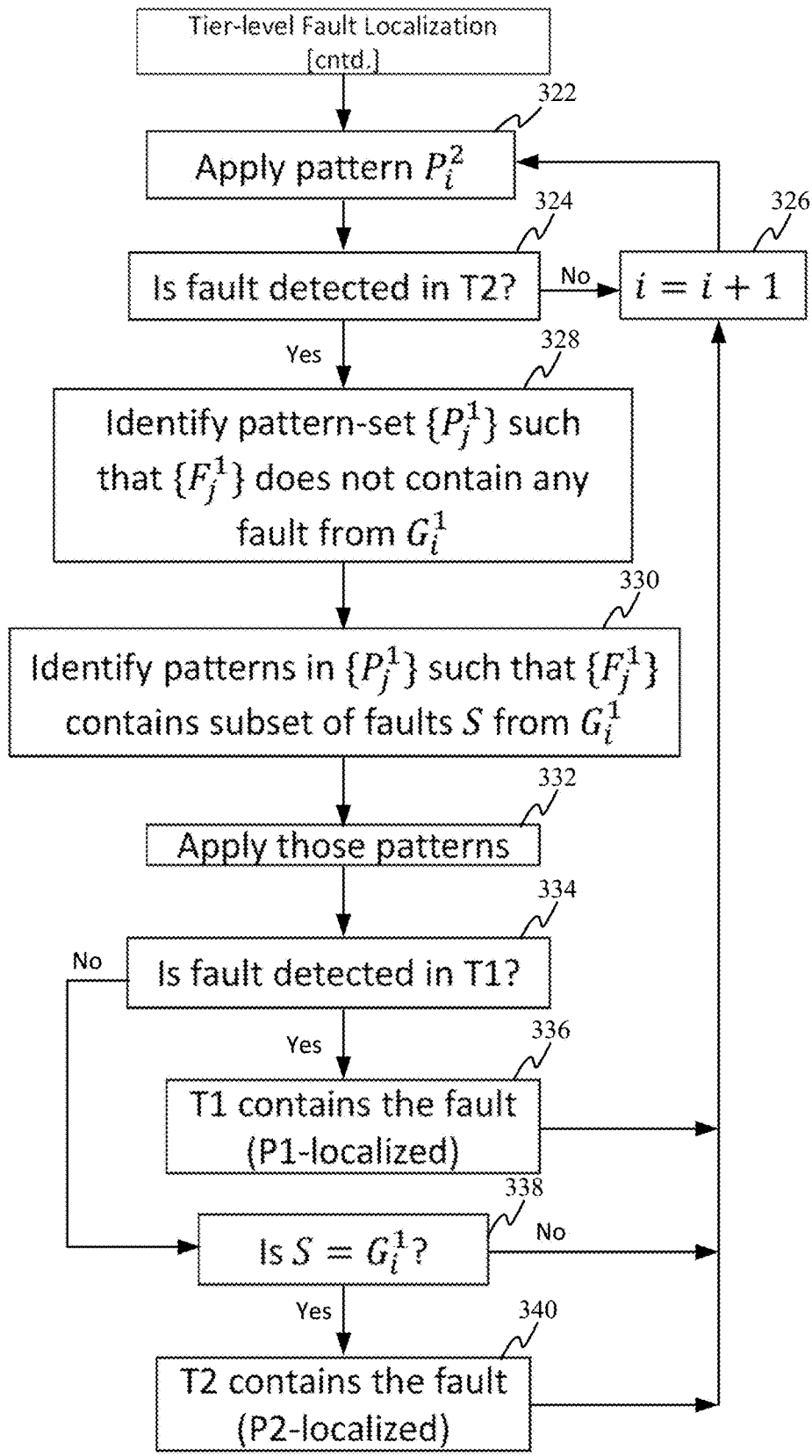

FIGS. 3A and 3B illustrate process flows for determining tier-level fault localization. FIG. 3A shows a part of the process for using test patterns for a first tier, while FIG. 3B shows a part of the process for using test patterns for a second tier. The following tables reflect the representative test patterns for the first tier (T1-P1) and the test patterns for the second tier (T2-P2), along with the associated faults captured in Tier 1 and Tier 2.

| Tier 1 (T1) test patterns (P1), i = 1, 2, 3, 4 | | |
| --- | --- | --- |
| Test patterns for T1 (P1) | T1 faults captured in T1 | T2 faults captured in T1 |
| $P_1^1$ | $F_1^1$ | $F_1^2$ |
| $P_2^1$ | $F_2^1$ | $F_2^2$ |
| $P_3^1$ | $F_3^1$ | $F_3^2$ |
| $P_4^1$ | $F_4^1$ | $F_4^2$ |

| Tier 2 (T2) test patterns (P2), i = 1, 2, 3, 4 | | |
| --- | --- | --- |
| Test patterns for T2 (P2) | T2 faults captured in T2 | T1 faults captured in T2 |
| $P_1^2$ | $G_1^2$ | $G_1^1$ |
| $P_2^2$ | $G_2^2$ | $G_2^1$ |
| $P_3^2$ | $G_3^2$ | $G_3^1$ |
| $P_4^2$ | $G_4^2$ | $G_4^1$ |

Turning to FIG. 3A, tier-level fault localization (300) can be performed to search for P1 and P2-localized faults. The process 300 can begin by applying test patterns $P_i^1$ (e.g., where i=1, 2, 3, 4, . . . ) for the first tier (302). A determination (304) is made whether there is a fault detected in T1 from an applied test pattern. If an output containing a fault is not detected in the first tier T1 from determination 304, the system moves to the next test pattern (i=i+1) (306); and that next test pattern is applied according to operation 302. If an output containing a fault is detected in the first tier T1 from determination 304, a pattern set $\{P_j^2\}$ is identified (308) such that T1 faults captured in points at the second tier (T2) $\{G_j^1\}$ do not contain any fault from T1 faults captured at observation points in T1 ($F_i^1$) where j=1, 2, 3, . . . ; and patterns in the identified pattern set $\{P_j^2\}$ are identified (310) such that T2 faults captured in T2 $\{G_j^2\}$ contains a subset of faults S from T2 faults captured at observation points in T1 ($F_i^2$). The identified patterns in identified pattern set $\{P_j^2\}$ are then applied (312).

A determination (314) is made whether there is a fault detected in T2 from the applied identified patterns in operation 312. If a fault is detected in T2 from determination 314, then it is determined (316) that T2 contains the fault (P2—localized) and the system moves to the next test pattern in operation 306 to be applied according to operation 302. If a fault is not detected in T2 from determination 314, a determination (318) is made whether the fault detected in T1 from operation 304 is part of the subset of faults S from T2 faults captured in T1 ($F_i^2$). That is, if $S=F_i^2$. If it is determined from operation 318 that S is not part of $F_i^2$, the system moves to the next test pattern in operation 306 to be applied according to operation 302. If it is determined from operation 318 that $S=F_i^2$, then it is determined (320) that T1 contains the fault (P1—localized) and the system moves to the next test pattern in operation 306 to be applied according to operation 302. The process beginning from operation 302 repeats until there are no more next test patterns.

Turning to FIG. 3B, once the tier 1 test patterns ($P_i^1$) have been applied, the process can continue by applying test patterns $P_i^2$ (e.g., where i=1, 2, 3, 4, . . . ) for the second tier (322). A determination (324) is made whether there is a fault detected in T2 from an applied test pattern. If an output containing a fault is not detected in the second tier T2 from determination 324, the system moves to the next test pattern (i=i+1) (326); and that next test pattern is applied according to operation 322. If an output containing a fault is detected in the second tier T2 from determination 324, a pattern set $\{P_j^1\}$ is identified (328) such that T1 faults captured in points at the first tier (T1) $\{F_j^1\}$ do not contain any fault from T1 faults captured in T2 ($G_i^1$), where j=1, 2, 3, . . . ; and patterns in the identified pattern set $\{P_j^1\}$ are identified (330) such that T1 faults captured in T1 $\{F_j^1\}$ contains a subset of faults S from T1 faults captured in T2 ($G_i^1$). The identified patterns in identified pattern set $\{P_j^1\}$ are then applied (332).

A determination (334) is made whether there is a fault detected in T1 from the applied identified patterns in operation 332. If a fault is detected in T1 from determination 334, then it is determined (336) that T1 contains the fault (P1—localized) and the system moves to the next test pattern in operation 326 to be applied according to operation 322. If a fault is not detected in T1 from determination 334, a determination (338) is made whether the fault detected in T2 from operation 324 is part of the subset of faults S from T1 faults captured in T2 ($G_i^1$). That is, if $S=G_i^1$. If it is determined from operation 338 that S is not part of $G_i^1$, the system moves to the next test pattern in operation 326 to be applied according to operation 322. If it is determined from operation 338 that $S=G_i^1$, then it is determined (340) that T2 contains the fault (P2-localized) and the system moves to the next test pattern in operation 326 to be applied according to operation 322. The process beginning from operation 322 repeats until there are no more next test patterns for the second tier.

FIGS. 4A-4E show an example process for determining observation points. The example process can be referred to as a node rank algorithm for observation point insertion and can be used to rank nodes for selection as an end point. The process, which is a specific implementation of process 240 described with respect to FIG. 2B, includes extrapolating a netlist into a node graph that describes the same circuit, calculating observability that each primary output node has in the circuit—or, in other words, the number of unique circuit elements that exist within the fanout of a particular primary output, and ranking these primary output nodes such that those primary output nodes with an observability above a certain threshold can be selected for observation point insertion. That is, the node rank algorithm assigns a node rank $NR_i$ of each ith output node (e.g., at an ILV) in the circuit-graph of a tier based on the likelihood of a fault in the tier propagating through the ILV. Output nodes with higher node-ranks are selected for observation points.

Figure 4A:
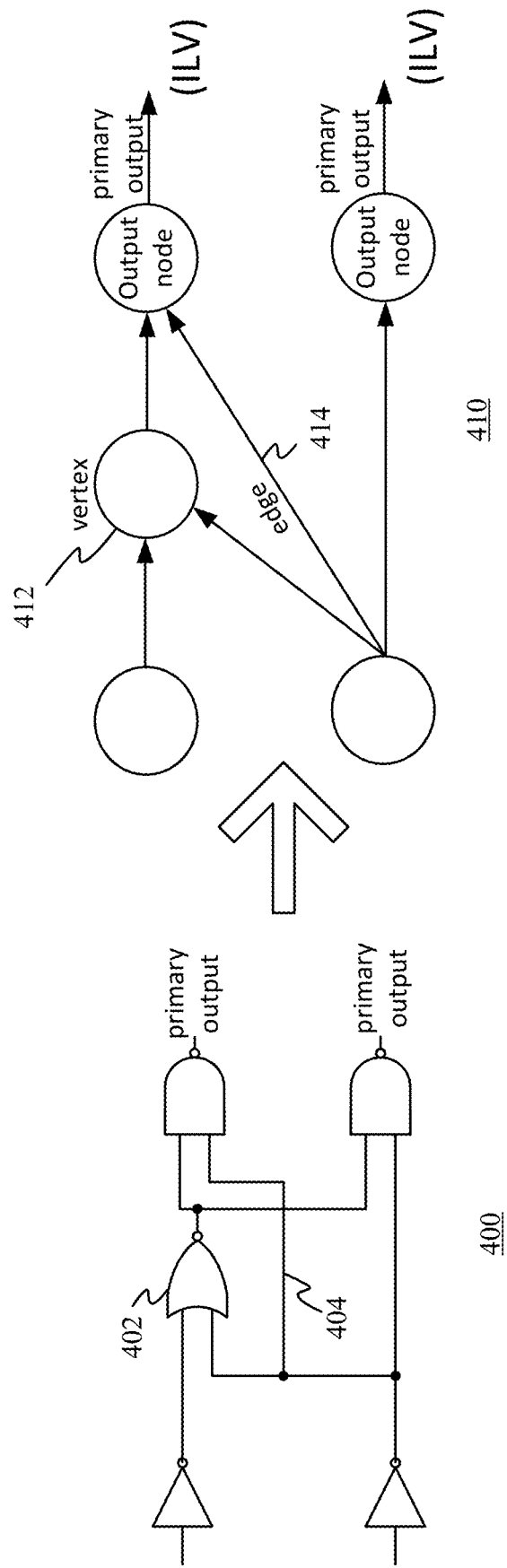
FIGS. 4A-4E show an example process for determining observation points.
Figure 4B:
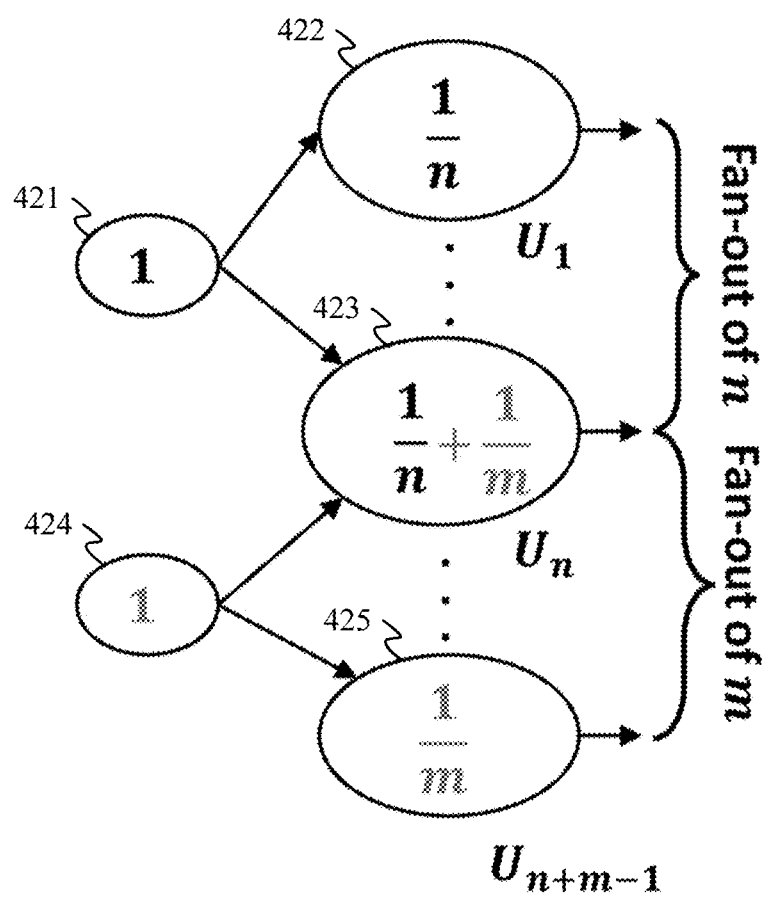

Turning to FIG. 4A, the process can begin by transforming a netlist into a node graph. For example, a gate-level netlist of a logic tier (e.g., logic gates 400) can be mapped to a directed acyclic graph (e.g., node graph 410). This process can use typical mappings to create the node graph 410 based on the netlist (of logic gates 400) of a circuit or subcircuit. For example, a circuit element or gate 402 from logic gates 400 can be transformed into a node 412 of the node graph 410. Connections 404 between the circuit elements or gates can be transformed into edges 414. Each node can include a value field that can be used in future calculations.

The node rank algorithm applied to the node graph 410 can involve an equal-split or "uniqueness" heuristic. For example, referring to FIG. 4B, a value can be assigned to each value field to initialize the nodes. The value assigned can be the same initial value for each value field of each node (e.g., a value of 1 can be assigned). The values can be propagated from inputs of the node graph towards primary outputs of the node graph. Propagating values can be done until all nodes with a succeeding edge have a value of zero in its value field. That is, an iterative splitting and forward propagation of node values is performed, where a uniqueness U, indicates effective number of gates uniquely observed by ith output node after all iterations. Output nodes with higher node ranks are selected for observation points. Here, it can be seen that a first node 421 fans out to end nodes 1 to n (e.g., end node$_n$ 422 to end node$_n$ 423. The value of 1 assigned to the first node 421 is split evenly to n end nodes 1 to n, giving each a value of 1/n. Similarly, a second node 424 fans out to m end nodes n to n+m−1 (e.g., end node$_n$ 423 to end node$_{n+m-1}$ 425. The value of 1 assigned to the second node 424 is split evenly to the end nodes n to n+m−1, giving each a value of 1/m. Since the end node$_n$ 423 receives a propagated value from both the first node 421 and the second node 424, the resulting uniqueness $U_n$ for the end node$_n$ 423 is 1/n+1/m.

Figure 4C:
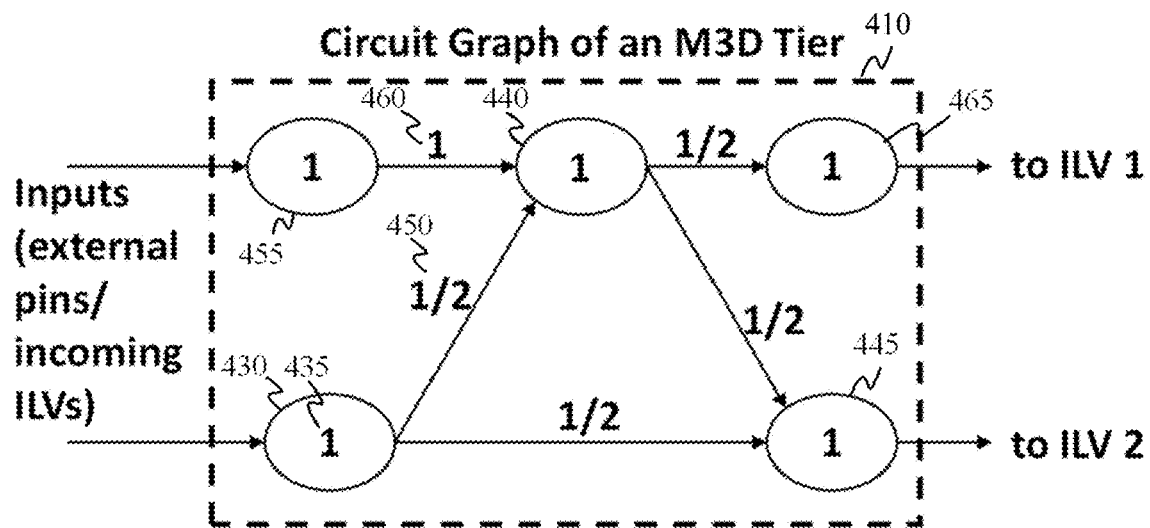

Turning to FIG. 4C, applying the described node rank algorithm to the node graph 410, all nodes in the graph can be initialized to the value of 1 and the number of succeeding downstream nodes identified. For example, starting node 430 with node value of 1 in its value field 435 has two succeeding nodes, intermediate node 440 and end node 445. Since propagating the values in the nodes can include dividing a value of the value field 435 of the starting node 430 into equal parts for each succeeding edge of the first node 430 to determine a first propagated value 450, the node value at the value field 435 is split into two so ½ would propagate to intermediate node 440 and ½ would propagate to end node 445. In the case of a node with exactly one succeeding edge, such as between the upper starting node 455 and the intermediate node 440, the value propagated from the upper starting node (e.g., propagated value 460) can simply be the value in the value field (e.g., 1). Since the intermediate node 440 also has two succeeding edges, the propagated value from the intermediate node 440 to each of the end node 445 and the upper end node 465 is ½. Propagation can be done in a variety of ways, including choosing nodes to propagate at random, propagating all nodes simultaneously, and propagating nodes of a certain depth simultaneously.

Figure 4D:
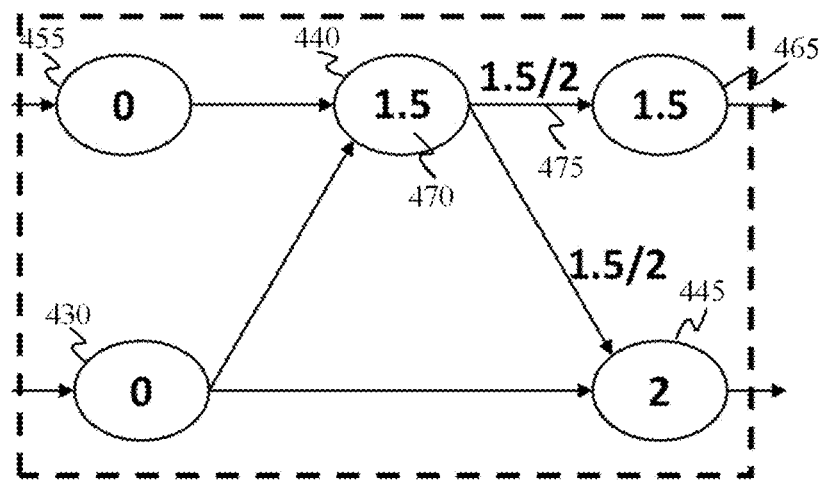

Turning to FIG. 4D, the propagated values can be added to an immediately succeeding node and values can continue to be propagated. For example, the intermediate node 440 receives the propagated value 450 of ½ from the starting node 430 and the propagated value 460 of 1 from the upper starting node 455, resulting in a value of 1.5 at its value field 470. It can also be seen that the intermediate node's initial value of 1 has propagated to the end nodes 465 and 445 (along with the ½ from the starting node 430 to the end node 445) in the operations described with respect to FIG. 4C, resulting in a node value of 1.5 for the upper end node 465 and a node value of 2 for the end node 445. Because the starting node 430 and the upper starting node 455 do not have a preceding propagating edge, their node values are 0. Thus, as part of the iterative process, nodes with values in their node value fields can have propagated values sent to succeeding nodes. As shown in FIG. 4D, the node value of 1.5 at the value field 470 of the intermediate node 440 is split into two so a propagated value 475 of 1.5/2 would propagate to the upper end node 465 and 1.5/2 would propagate to end node 445.

Figure 4E:
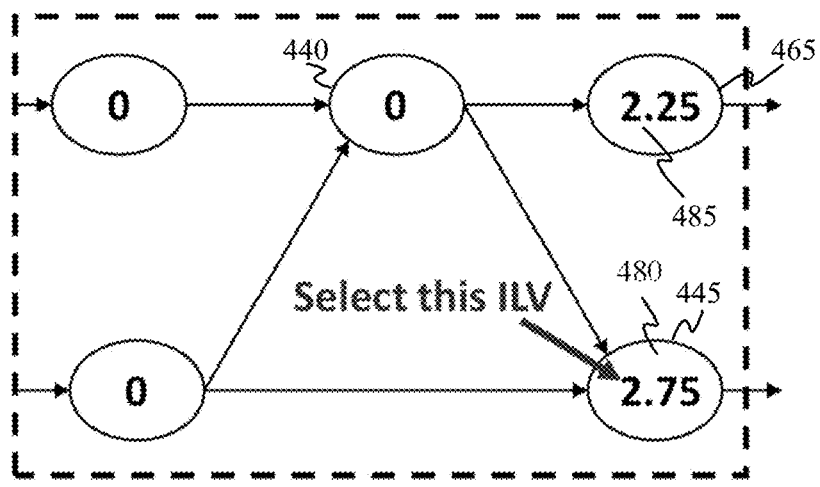

Turning to FIG. 4E, all values can eventually be propagated to the nodes without succeeding edges (e.g., end nodes such as to an ILV or subcircuit terminus nodes). For example, the end node 445 and the upper end node 465 each receive the propagated value 475 of 1.5/2 from the intermediate node 440 as described with respect to FIG. 4D, resulting in a value of 2.75 at the value field 480 of the end node 445 and a value of 2.25 at the value field 485. Because the starting node 430, the upper starting node 455, and the intermediate node 440 do not have a preceding propagating edge, their node values are 0. Once this is done, values in value fields for the one or more nodes without succeeding edges can be considered to provide a metric for observability or uniqueness. One or more criteria can be determined to accept nodes without succeeding edges as observation points. For example, assuming the criteria is a threshold value of 2.5, as seen in this example, the end node 445 is selected for an observation point because of its value of 2.75. In some cases, instead of a threshold value, a specified number of observation points are selected. For example, the top 5 end nodes can be selected (or in the illustrative case, the top node of two).

Figure 5:
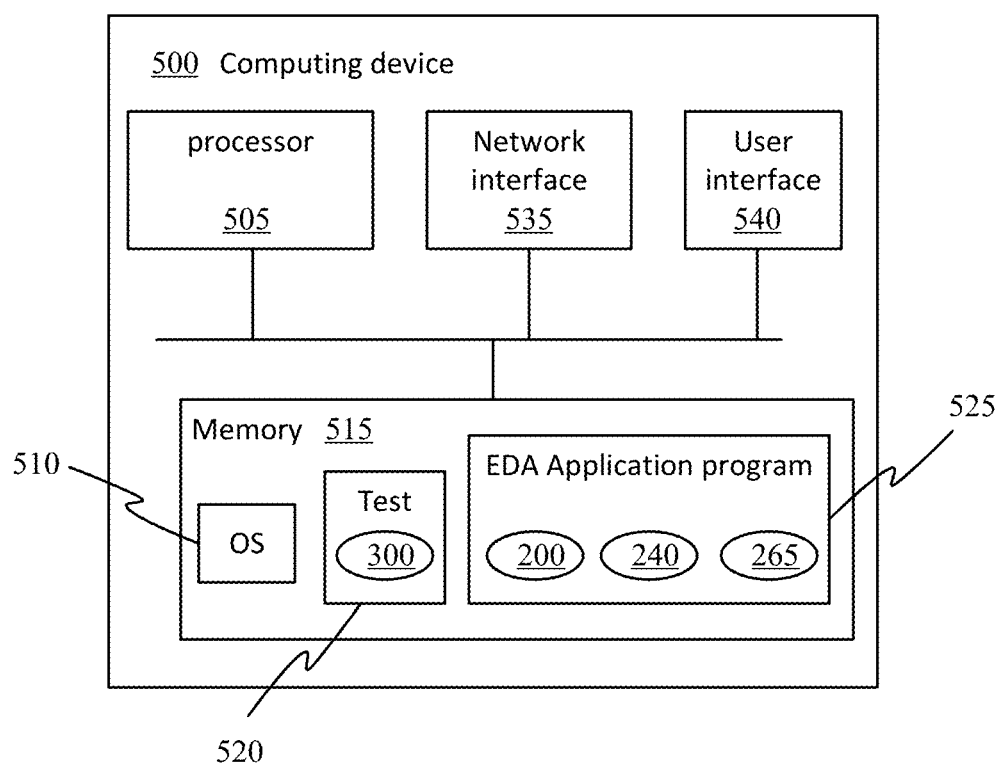
FIG. 5 is a block diagram illustrating components of a computing device used for electronic design automation (EDA) with observation point insertion or testing.

FIG. 5 is a block diagram illustrating components of a computing device used for EDA with observation point insertion or testing. For example, a computing device embodied as system 500 can be used in implementing a computing device executing an EDA software tool incorporating the describe observation point insertion and/or fault localization using the inserted observation points, including the processes described with respect to FIGS. 2A, 2B, 3A, 3B, and 4A-4E. It should be understood that aspects of the system described herein are applicable to both mobile and traditional desktop computers, as well as server computers and other computer systems. Accordingly, certain aspects described with respect to system 500 are applicable to server(s) on which a software tool may be carried out in the case of networked computing stations or web-based tools.

For example, system 500 includes a processor 505 (e.g., CPU, GPU, FPGA) that processes data according to instructions of one or more application programs (which can include the modules described herein for the EDA tools), and/or operating system (OS) 510 stored in memory 515.

Memory 515 can be any suitable computer-readable storage medium including, but not limited to, volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the memory 515 consist of transitory propagating signals.

Memory 515 can store application programs such as programs for automated testing 520 that include fault localization identification such as instructions for method 300 described with respect to FIGS. 3A and 3B and EDA 530 with modules for performing methods 200, 240, and/or 265 as described with respect to FIGS. 2A-2C (and FIGS. 4A-4E).

The software tools of applications 520 and 525 are software implements to help carry out a particular function (or functions). The described software tools can make decisions or take actions such as identification of observation points and placement of design for test elements at the identified observation points.

System 500 may also include a radio/network interface 535 that performs the function of transmitting and receiving radio frequency communications. The radio/network interface 535 facilitates wireless connectivity between system 500 and the "outside world," via a communications carrier or service provider. The radio/network interface 535 allows system 500 to communicate with other computing devices, including server computing devices and other client devices, over a network.

In various implementations, data/information used by and/or stored via the system 500 may include data caches stored locally on the device or the data may be stored on any number of storage media that may be accessed by the device via the radio/network interface 535 or via a wired connection between the device and a separate computing device associated with the device, for example, a server computer in a distributed computing network, such as the Internet. As should be appreciated such data/information may be accessed through the device via the radio interface 535 or a distributed computing network. Similarly, such data/information may be readily transferred between computing devices for storage and use according to well-known data/information transfer and storage means, including electronic mail and collaborative data/information sharing systems.

System 500 can also include user interface system 540, which may include input and output devices and/or interfaces such as for audio, video, touch, mouse, and keyboard. Visual output can be provided via a display that may present graphical user interface ("GUI") elements, text, images, video, notifications, virtual buttons, virtual keyboards, messaging data, circuit layout, and any other information that is capable of being presented in a visual form.

The methods and processes described herein can be embodied as code and/or data. The software code and data described herein can be stored, for example as modules, on one or more computer readable media, which may include any device or medium that can store code and/or data for use by a computer system. As used herein, computer readable storage media/medium should not be construed to consist of transitory propagating signals.

Accordingly, embodiments of the subject invention may be implemented as a computer process, a computing system, or as an article of manufacture, such as a computer program product or computer-readable storage medium. Certain embodiments of the invention contemplate the use of a machine in the form of a computer system within which a set of instructions, when executed, can cause the system to perform any one or more of the methodologies discussed above, including providing a software tool or a set of software tools that can be used during the physical design of integrated circuits and/or printed circuit boards and/or system level design. The set of instructions for the software tool can be stored on a computer program product, which may be one or more computer readable storage media readable by a computer system and encoding a computer program including the set of instructions and other data associated with the software tool.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

EXPERIMENTS

The node rank algorithm ("NodeRank")-based heuristics for observation point insertion (OPI) are evaluated using five gate-level partitioned two-tier M3D benchmarks based on the IWLS'05 and OpenCore designs—AES, USB FUNCT, Ethernet, VGA LCD, and Rocketcore. The experimental flow for NodeRank-based OPI involves first synthesizing the 2D design of a benchmark using the open-source Nangate 45 nm cell library. The gate-level 2D netlist is then converted into a circuit-graph G (such as described with respect to FIG. 4A). The circuit graph G is partitioned into two sub-graphs T1 and T2, where each sub-graph corresponds to a tier of the M3D design. A random partitioning approach is used where each node in G is placed in either the top tier (T1) or the bottom tier (T2) with probabilities of 0.5 each. If an edge E in G connects two nodes from different sub-graphs, the wire represented by E is considered an ILV. A node V is considered an ILV node if E is one of the fan-out edges of V. The sink nodes in the sub-graphs therefore represent the PO-connected gates, scan flops, and ILV-connected gates (ILV nodes). The NodeRank-based OP analysis (e.g., as described with respect to FIGS. 4A-4E) is run on the individual tiers, i.e., sub-graphs, and a ranked list of ILV nodes is obtained. Note that gate-level netlists of the two tiers for NodeRank-based OPI is not created because the NodeRank algorithm is able to run on the sub-graphs. Therefore, NodeRank-based OP analysis can be conveniently performed at the time of tier-partitioning. Separate netlists can be generated for the two tiers (from the sub-graphs) for retrofitting a commercial DfT tool for OPI in M3D designs. A 2.1 GHz Intel Xeon Gold 6230 CPU with 192 GB of RAM was used for simulations.

OPI (Observation Point Insertion) experiments were performed by retrofitting a commercial DfT tool for tier-level fault localization in a two-tier M3D IC. The goal is to enable meaningful comparisons with the proposed method and also with T. Hosokawa et al. "Design for testability strategies using full/partial scan designs and test point insertions to reduce test application times," ASPDAC, 2001 ("Hosokawa"—[22] in the tables) and a baseline with no OPI. The experiments are described below:

Retrofit-I: Commercial tool is constrained to insert OPs only on the ILV nodes in partitioned gate-level netlists of the two tiers of the Rocketcore benchmark; the constraint helps in maximizing the degree of fault localization achieved by the OPs. The maximum allowable OP count (i.e., the OP budget) in a tier is set at 10% of the outgoing ILV count (i.e., at most 3075 Ops) can be inserted in the two tiers. The gate and connectivity information of a specific tier are considered by the tool during OP analysis in that tier. Unfortunately, the tool is unable to find any useful locations for OPI for this retrofitting solution.

Retrofit-II: Next, the tool is not restricted to OPI on ILV nodes; the tool is allowed to insert OPs anywhere in a tier. The OP budget is set at 10% of the outgoing ILV count. The scope of OP analysis is restricted to the netlist of the tier in which the tool attempts to insert OPs—separate partitioned netlists of the tiers, instead of the full Rocketcore design, are presented to the tool for OPI. Masks were set on the POs of the tier (i.e., the POs are made unobservable) so that the tool is forced to insert OPs on the ILV nodes. However, irrespective of the placement of output masks, the tool manages to insert only 307 OPs in the two tiers—185 in T1 and 122 in T2. The resulting pattern count (in P1 and P2 combined) is 1254. Moreover, DF L1 and DF L2 are 79.73% and 80.38%, respectively. Next, OPI with NodeRank-based hybrid heuristic is performed. For the same number of OPs inserted in each tier as the commercial tool, the total pattern count, DF L1, and DF L2 with NodeRank are 1061, 81.84%, and 83.06%, respectively. Not being M3D-aware, the commercial tool is unable to leverage the full OP budget and the quality of OPI—on the basis of the tier-wise OP analysis—is not as good as NodeRank.

Retrofit-III: Next the tool is allowed to consider the full Rocketcore design during OP analysis, while restricting OPI on the ILV nodes in order to enhance tier-level fault localization. The tool is able to insert 2065 OPs in the two tiers, compared to 307 OPs in Retrofit-I. Although the OP budget is still not fully utilized, the commercial tool is able to identify a significant number of ILV nodes as candidate OPs when the scope of OP analysis is expanded to the full M3D design. Hereon, evaluation of the effectiveness of OPI by the commercial tool on ILV nodes is based on the full-design OP analysis.

The quality of OPI by NodeRank-based uniqueness and hybrid (w=0.5) heuristics are compared with a commercial Design-for-Test tool ("COM")-based OPI flow as described in Retrofit-III. The effectiveness of NodeRank-based OPI is also compared with another ATPG-independent topology-driven OPI method presented in Hosokawa.

Figures 6A, 6B:
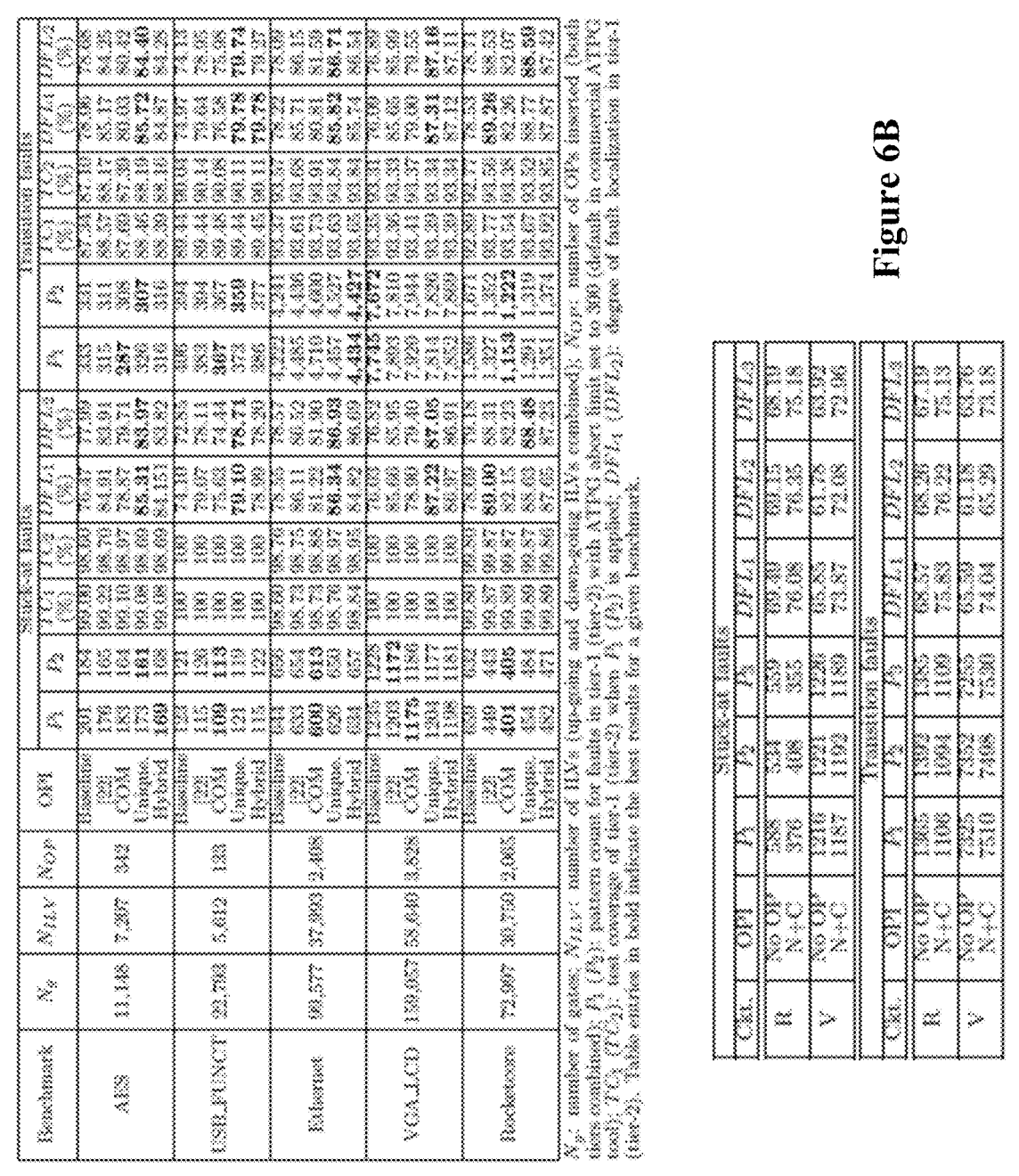

FIG. 6A shows a table of an evaluation of the effectiveness of observation point insertion for stuck-at and transition faults in two-tier M3D designs. Referring to FIG. 6A, the effectiveness of the different OPI methods for stuck-at and transition faults can be seen. For stuck-at faults, the pattern count with COM-based OPs is lower than NodeRank in most cases (except AES). This is because COM inserts OPs to enhance circuit testability. NodeRank inserts OPs with the objective of enhancing tier-level fault localization and therefore, achieves higher degree of fault localization than COM for both the tiers. Moreover, both uniqueness and hybrid heuristics achieve higher fault localization than Hosokawa for all five benchmarks; the only exception is tier-1 of Rocketcore.

Next it is shown that even a very small increase in degree of fault localization (DFL) is significant. At the 7 nm technology node, a defect density for a die has been reported to be 0.09 defects per $cm^2$. At 7 nm, the density is ~116×108 transistors per $cm^2$, which is equivalent to ~2.9 billion gates per $cm^2$. The defect density, expressed as a percentage with respect to the gate count, is as small as 3.1×10-9. Therefore, even a small increase in DFL is significant because even a small increase will enable defect localization for the defect densities listed above. For an emerging technology such as M3D integration, it is essential to localize and characterize even such a small number of faults for yield ramp-up and optimization of 3D processing steps at advanced nodes.

FIG. 6B shows experimental results compares use of OP analysis to a more widespread methodology in terms of pattern sets and percentage of faults that were able to be localized. To achieve both high testability and high degree of fault localization, NodeRank (i.e., the N in N+C) can be integrated with existing commercial tools (COM) (i.e., the C in N+C). Using the integrated OPI flow (N+C), OPI was demonstrated in three-tier gate-level partitioned Rocketcore (R) and VGA_LCD (V) benchmark circuits (ckt). The total number of ILVs (up-going and down-going combined) in Rocketcore and VGA_LCD are 54,568 and 103,763, respectively. The COM performs OP analysis on the full M3D design and returns a list of candidate OPs—not necessarily ILV nodes. In parallel, the NodeRank-based uniqueness heuristic is run on the sub-graphs of the three tiers separately for OP analysis. Finally, OPs are inserted on the union of the candidate OP locations returned by NodeRank and COM. The maximum OP budget is set to 5% of the total instance count in the full M3D design—2.5% each from NodeRank and COM analysis. Eventually, due to some overlap between the OPs selected by NodeRank and COM, a total of 1427 (2974) OPs are inserted in Rocketcore (VGA_LCD), resulting in an area overhead of 4.4% (4.7%) with respect to the total instance count. Compared to baseline, the integrated OPI flow achieves up to 37% (22%) reduction in pattern count and 11% (10%) increase in the degree of tier-level fault localization for stuck-at (transition) faults.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for applying observation points for integrated circuit testing, the method comprising:
   receiving a netlist for an integrated circuit (IC) comprising at least a first subcircuit and a second subcircuit;
   determining, from the netlist, one or more observation points, each determined observation point corresponding to an output node which provides observability, into at least the first subcircuit, of an effective number of gates above a specified threshold; and
   inserting a design for test element into a layout file of the integrated circuit at each determined observation point.

2. The method of claim 1, further comprising:
   generating test patterns using the layout file having the determined one or more observation points.

3. The method of claim 1, wherein the determining the one or more observation points comprises:
   transforming the netlist into a node graph, wherein each node corresponds to a gate and each edge corresponds to a connection between two gates and wherein each node includes a value field;
   assigning a same initial value to the value field of each node;
   propagating values in the value fields of the nodes until all nodes with a succeeding edge have a value of zero in its value field; and
   identifying end nodes having propagated totals above a threshold, the identified end nodes being the output nodes at which the observation points are located.

4. The method of claim 3, wherein propagating the values in the nodes comprises:
   dividing a value of a first value field of a first node into equal parts for each succeeding edge of the first node; and
   adding the divided value to a second value field of a second node, wherein the second node is an immediately succeeding node on a succeeding edge.

5. The method of claim 1, wherein the IC is a monolithic 3D IC comprising at least two tiers, the first subcircuit being at a first tier of the at least two tiers and the second subcircuit being at a second tier of the at least two tiers.

6. The method of claim 1, wherein the design for test element comprises a scan flop.

7. The method of claim 1, wherein the determining of the one or more observation points and the inserting of the design for test element is performed after a placement operation of an electronic design automation tool.

8. The method of claim 1, further comprising performing automatic test pattern generation using the layout file having the determined observation points.

9. A computer-readable storage medium having instructions stored thereon that when executed by a computing device direct the computing device to perform a method comprising:
   receiving a netlist for an integrated circuit (IC) comprising at least a first subcircuit and a second subcircuit;
   determining, from the netlist, one or more observation points, each determined observation point corresponding to an output node which provides observability, into at least the first subcircuit, of an effective number of gates above a specified threshold; and
   inserting a design for test element into a layout file of the integrated circuit at each determined observation point.

10. The computer-readable storage medium of claim 9, further comprising instructions to further perform:
    generating test patterns using the layout file having the determined one or more observation points.

11. The computer-readable storage medium of claim 9, wherein the determining the one or more observation points comprises:
    transforming the netlist into a node graph, wherein each node corresponds to a gate and each edge corresponds to a connection between two gates and wherein each node includes a value field;
    assigning a same initial value to the value field of each node;
    propagating values in the value fields of the nodes until all nodes with a succeeding edge have a value of zero in its value field; and
    identifying end nodes having propagated totals above a threshold, the identified end nodes being the output nodes at which the observation points are located.

12. The computer-readable storage medium of claim 11, wherein propagating the values in the nodes comprises:
    dividing a value of a first value field of a first node into equal parts for each succeeding edge of the first node; and
    adding the divided value to a second value field of a second node, wherein the second node is an immediately succeeding node on a succeeding edge.

13. The computer-readable storage medium of claim 9, wherein the IC is a monolithic 3D IC comprising at least two tiers, the first subcircuit being at the first tier and the second subcircuit being at the second tier.

14. The computer-readable storage medium of claim 9, wherein the design for test element comprises a scan flop.

15. The computer-readable storage medium of claim 9, wherein the determining of the one or more observation points and the inserting of the design for test element is performed after a placement operation of an electronic design automation tool.

16. The computer-readable storage medium of claim 9, further comprising instructions to further perform:
    generating automatic test patterns using the layout file having the determined observation points.

17. The computer-readable storage medium of claim 9, further comprising instructions to perform a method comprising:
    applying test patterns for the first subcircuit to the IC;
    determining whether there is a fault detected in the first subcircuit from an applied test pattern for the first subcircuit;

if there is no fault detected in the first subcircuit from the applied test pattern for the first subcircuit, moving to a next test pattern of the test patterns for the first subcircuit; and if there is the fault detected in the first subcircuit from the applied test pattern for the first subcircuit:

identifying a first pattern set such that faults of the first subcircuit captured in observation points at the second subcircuit do not contain any fault from the first subcircuit captured in observation points at the first subcircuit and that faults of the second subcircuit captured in the observation points at the second subcircuit contain a subset of faults from the faults of the second subcircuit captured at the observation points in the first subcircuit;

applying patterns of the first pattern set to the IC;

determining whether there is a fault detected in the second subcircuit from an applied pattern of the first pattern set;

if there is the fault detected in the second subcircuit from the applied pattern of the first pattern set, determining that the second subcircuit contains the fault and moving to the next test pattern of the test patterns for the first subcircuit; and if there is no fault detected in the second subcircuit from the applied pattern of the first pattern set, determining whether the fault detected in the first subcircuit from the applied test pattern for the first subcircuit is part of the subset of faults from the faults of the second subcircuit captured at the observation points in the first subcircuit;

if it is determined that the fault detected in the first subcircuit is not part of the subset of faults, moving to the next test pattern of the test patterns for the first subcircuit; and if it is determined that the fault detected in the first subcircuit is part of the subset of faults, determining that the first subcircuit contains the fault and moving to the next test pattern of the test patterns for the first subcircuit.

18. The computer-readable storage medium of claim 17, further comprising instructions to perform a method comprising:

applying second test patterns for the second subcircuit to the IC;

determining whether there is a second fault detected in the second subcircuit from an applied second test pattern for the second subcircuit;

if there is no second fault detected in the second subcircuit from the applied second test pattern for the second subcircuit, moving to a next second test pattern of the second test patterns for the second subcircuit; and if there is the second fault detected in the second subcircuit from the applied second test pattern for the second subcircuit:

identifying a second pattern set such that second faults of the first subcircuit captured in observation points at the first subcircuit do not contain any fault from the first subcircuit captured in observation points at the second subcircuit and that second faults of the first subcircuit captured in the observation points at the first subcircuit contain a second subset of second faults from the second faults of the first subcircuit captured at the observation points in the second subcircuit;

applying second patterns of the second pattern set to the IC;

determining whether there is a second fault detected in the first subcircuit from an applied second pattern of the second pattern set;

if there is the second fault detected in the first subcircuit from the applied second pattern of the second pattern set, determining that the first subcircuit contains the second fault and moving to the next second test pattern of the second test patterns for the second subcircuit; and if there is no second fault detected in the first subcircuit from the applied second pattern of the second pattern set, determining whether the second fault detected in the second sub circuit from the applied second test pattern for the second subcircuit is part of the second subset of second faults from the second faults of the first subcircuit captured at the observation points in the second subcircuit;

if it is determined that the second fault detected in the second subcircuit is not part of the second subset of faults, moving to the next second test pattern of the second test patterns for the second subcircuit; and if it is determined that the second fault detected in the second subcircuit is part of the second subset of faults, determining that the second subcircuit contains the second fault and moving to the next second test pattern of the second test patterns for the second subcircuit.

* * * * *